(12) United States Patent
Ogawa et al.

(10) Patent No.: US 11,837,903 B2
(45) Date of Patent: Dec. 5, 2023

(54) CONTROL APPARATUS, MANAGEMENT SERVER, CONTROL METHOD, AND STORAGE MEDIUM

(71) Applicant: HONDA MOTOR CO., LTD., Tokyo (JP)

(72) Inventors: Makoto Ogawa, Wako (JP); Daisuke Tsutsumi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 283 days.

(21) Appl. No.: 17/197,760

(22) Filed: Mar. 10, 2021

(65) Prior Publication Data
US 2021/0305815 A1 Sep. 30, 2021

(30) Foreign Application Priority Data

Mar. 27, 2020 (JP) ................ 2020-058229

(51) Int. Cl.
| | |
|---|---|
| H02J 7/00 | (2006.01) |
| H01M 10/633 | (2014.01) |
| B60L 53/62 | (2019.01) |
| B60L 58/24 | (2019.01) |
| G06Q 10/0631 | (2023.01) |

(Continued)

(52) U.S. Cl.
CPC ............ H02J 7/007 (2013.01); B60L 53/62 (2019.02); B60L 58/24 (2019.02);
(Continued)

(58) Field of Classification Search
CPC . H02J 7/007; H02J 3/322; B60L 53/62; B60L 58/24; B60L 53/14;
(Continued)

(56) References Cited

U.S. PATENT DOCUMENTS

| | | | |
|---|---|---|---|
| 10,439,417 B2 | 10/2019 | Murata | |
| 2012/0041855 A1* | 2/2012 | Sterling | B60L 53/52 320/109 |

(Continued)

FOREIGN PATENT DOCUMENTS

| | | |
|---|---|---|
| CA | 2758439 A1 | 11/2010 |
| CN | 110712567 A | 1/2020 |

(Continued)

OTHER PUBLICATIONS

Extended European Search Report dated Aug. 13, 2021, issued in counterpart EP Application No. 21161724.6. (9 pages).

(Continued)

*Primary Examiner* — Paul Dinh
(74) *Attorney, Agent, or Firm* — WHDA, LLP

(57) ABSTRACT

The present invention provides a control apparatus configured to control a power unit, wherein the power unit comprises a battery, and a temperature adjuster configured to adjust a temperature of the battery to a target temperature at the time of charge or discharge of the battery, and the control apparatus calculates, based on information concerning a demand response plan used to adjust a power demand and supply, an incentive obtained by charge or discharge of the battery by the demand response plan and a power cost needed to adjust the temperature of the battery to the target temperature by the temperature adjuster at the time of charge or discharge of the battery, and controls, in a case where the incentive is larger than the power cost, the power unit to execute charge or discharge of the battery by the demand response plan.

9 Claims, 6 Drawing Sheets

(51) Int. Cl.
*G06Q 50/06* (2012.01)
*H01M 10/42* (2006.01)
*H01M 10/44* (2006.01)

(52) U.S. Cl.
CPC ....... *G06Q 10/06315* (2013.01); *G06Q 50/06* (2013.01); *H01M 10/4257* (2013.01); *H01M 10/443* (2013.01); *H01M 10/633* (2015.04); *H01M 2010/4271* (2013.01)

(58) Field of Classification Search
CPC .... B60L 2240/545; B60L 55/00; B60L 58/27; G06Q 10/06315; G06Q 50/06; H01M 10/4257; H01M 10/443; H01M 10/633; H01M 2010/4271; H01M 10/425; H01M 10/486; H01M 10/63; H01M 2220/20; Y02E 60/00; Y02E 60/10; Y02T 90/12; Y02T 10/70; Y02T 10/7072; Y02T 90/14; Y04S 10/126
USPC ........................................................ 320/109
See application file for complete search history.

(56) References Cited

U.S. PATENT DOCUMENTS

| | | |
|---|---|---|
| 2016/0214495 A1 | 7/2016 | Murata et al. |
| 2018/0198173 A1 | 7/2018 | Ichikawa |
| 2018/0205230 A1 | 7/2018 | Kudo et al. |
| 2019/0089020 A1* | 3/2019 | Ikeno ................. H01M 10/441 |
| 2019/0156383 A1 | 5/2019 | Khoo et al. |
| 2019/0207267 A1* | 7/2019 | Vickery ................. B60L 53/66 |
| 2020/0231056 A1* | 7/2020 | Sadano ................... H02J 3/322 |
| 2020/0282855 A1* | 9/2020 | Slutzky ............... H01M 10/441 |
| 2020/0318843 A1* | 10/2020 | Wenzel ..................... H02J 3/40 |

FOREIGN PATENT DOCUMENTS

| | | |
|---|---|---|
| JP | 2016-92953 A | 5/2016 |
| KR | 10-2014-0077064 A | 6/2014 |

OTHER PUBLICATIONS

Akhavan-Rezai et al., "Managing Demand for Plug-in Electric Vehicles in Unbalanced LV Systems With Photovoltaics", IEEE Transactions on Industrial Informatics, Jun. 2017, vol. 13, No. 3, pp. 1057-1067, cited in EP Extended European Search Report dated Jul. 14, 2023. (11 pages).

Extended European Search Report dated Jul. 14, 2023, issued in counterpart EP application No. 23170374.5. (11 pages).

* cited by examiner

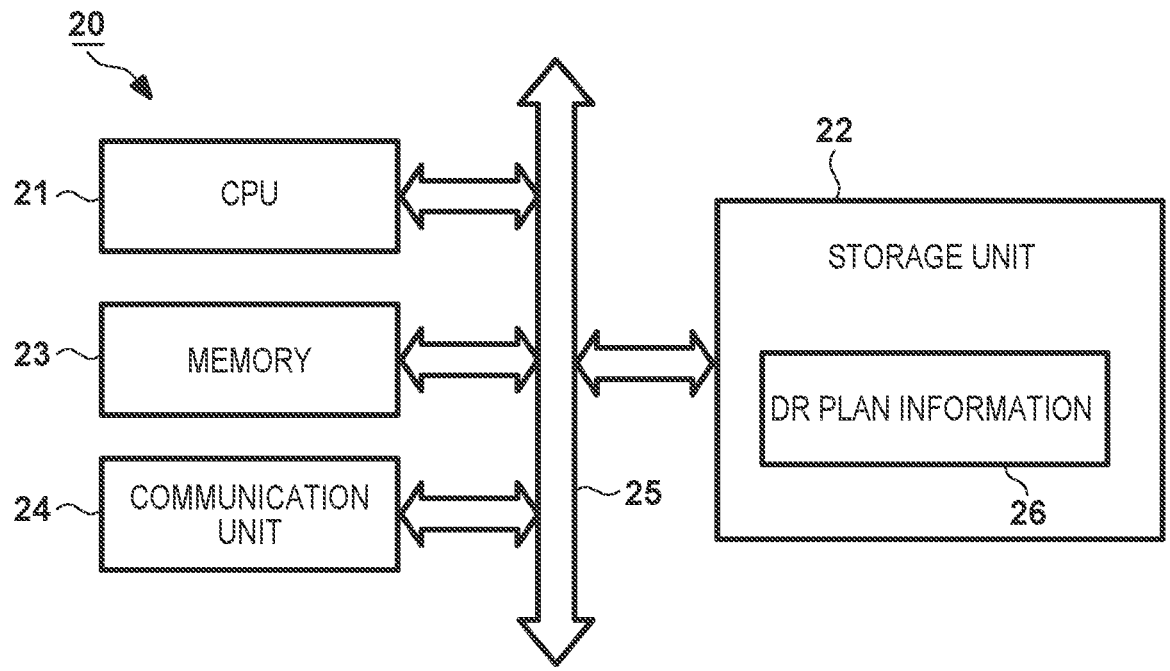
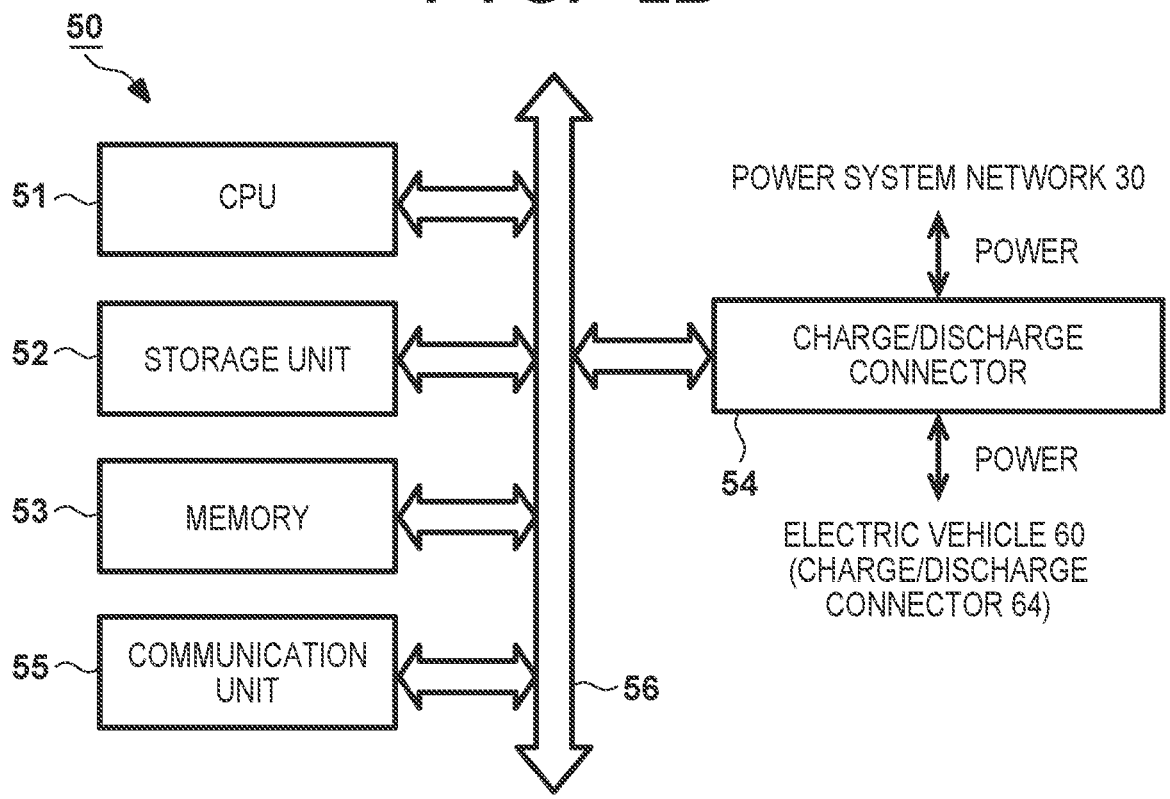

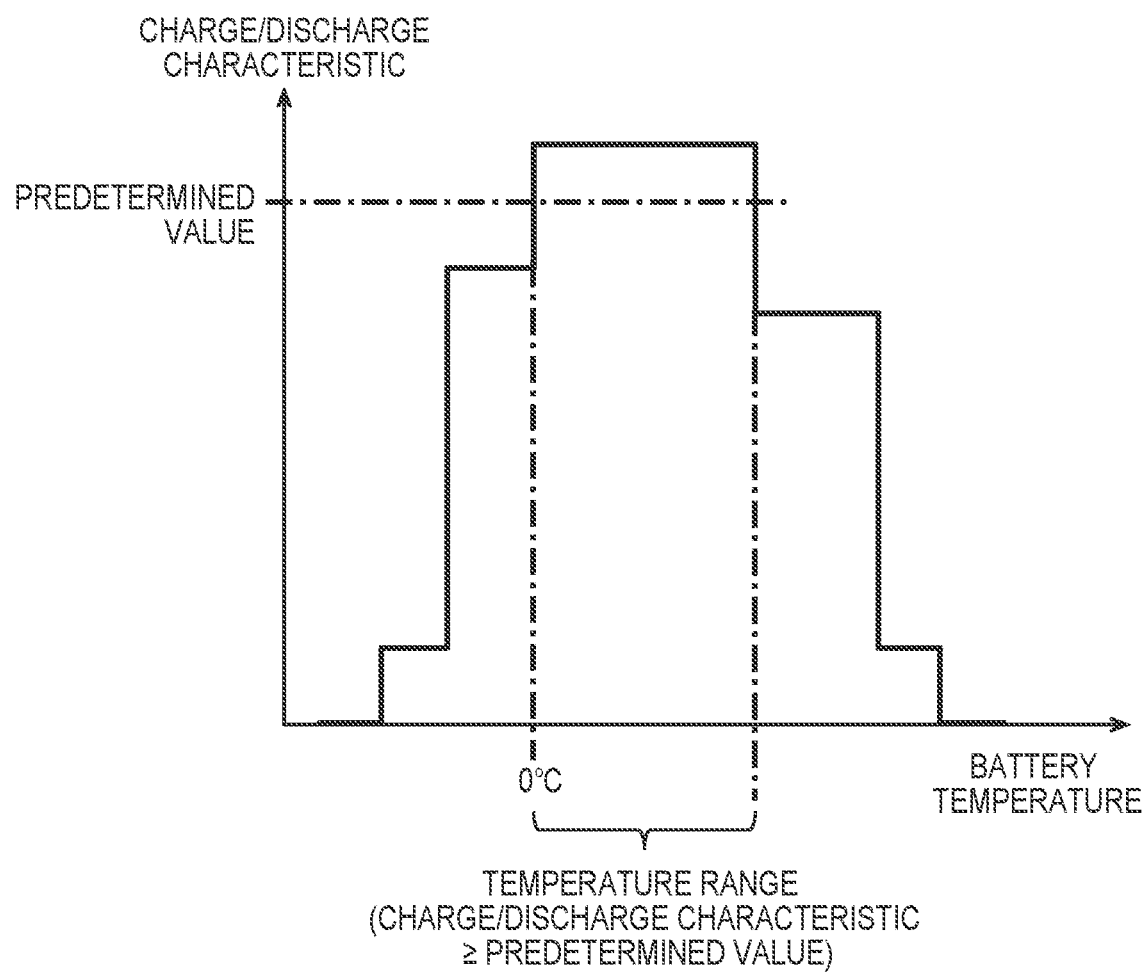

CONTROL APPARATUS, MANAGEMENT SERVER, CONTROL METHOD, AND STORAGE MEDIUM

CROSS-REFERENCE TO RELATED APPLICATION(S)

This application claims priority to and the benefit of Japanese Patent Application No. 2020-058229 filed on Mar. 27, 2020, the entire disclosure of which is incorporated herein by reference.

BACKGROUND OF THE INVENTION

Field of the Invention

The present invention relates to a control apparatus configured to control a power unit, a management server, a control method, and a storage medium.

Description of the Related Art

It is known that the charge/discharge characteristics of a battery used in an electric vehicle, such as the charge and discharge speeds, deteriorate in a low temperature environment (for example, 0° C. or less). Japanese Patent Laid-Open No. 2016-92953 proposes a method of reducing deterioration of the charge/discharge characteristic by adjusting the temperature of a battery using a heater when charging/discharging the battery in a low temperature environment.

In recent years, a VPP (Virtual Power Plant) system has received attention, which controls a power demand by a resource aggregator that brings the power units (power sources and resources) of a plurality of customers together to satisfy a power demand request in a power market. In such a VPP system, it is desirable to perform, as planned, the operation (demand response) of the power unit according to the request of the power demand in the power market.

However, if the method of heating the battery of a power unit by a heater, as described in Japanese Patent Laid-Open No. 2016-92953, is applied in the VPP system, the interests of customers may be harmed by the power cost of the heater, or it may be difficult to do the demand response as planned because of the time needed for battery temperature adjustment.

SUMMARY OF THE INVENTION

The present invention provides, for example, a technique advantageous in accurately detecting the position of a target outside a vehicle using a radio wave.

According to one aspect of the present invention, there is provided a control apparatus configured to control a power unit, wherein the power unit comprises a battery, and a temperature adjuster configured to adjust a temperature of the battery to a target temperature at the time of charge or discharge of the battery, and the control apparatus calculates, based on information concerning a demand response plan used to adjust a power demand and supply, an incentive obtained by charge or discharge of the battery by the demand response plan and a power cost needed to adjust the temperature of the battery to the target temperature by the temperature adjuster at the time of charge or discharge of the battery, and controls, in a case where the incentive is larger than the power cost, the power unit to execute charge or discharge of the battery by the demand response plan.

According to another aspect of the present invention, there is provided a control apparatus configured to control a power unit, wherein the power unit comprises a battery, and a temperature adjuster configured to adjust a temperature of the battery to a target temperature at the time of charge or discharge of the battery, and the control apparatus controls the temperature adjuster based on information concerning a demand response plan used to adjust a power demand and supply, such that the temperature of the battery reaches the target temperature until a start timing of the charge or discharge of the battery by the demand response plan.

Further features of the present invention will become apparent from the following description of exemplary embodiments with reference to the attached drawings.

BRIEF DESCRIPTION OF THE DRAWINGS

FIGS. 2A to 2C are block diagrams showing the arrangements of apparatuses in the VPP system;

FIG. 3 is a graph showing the relationship between a temperature and the charge/discharge characteristic of a battery;

DESCRIPTION OF THE EMBODIMENTS

Figure 1:
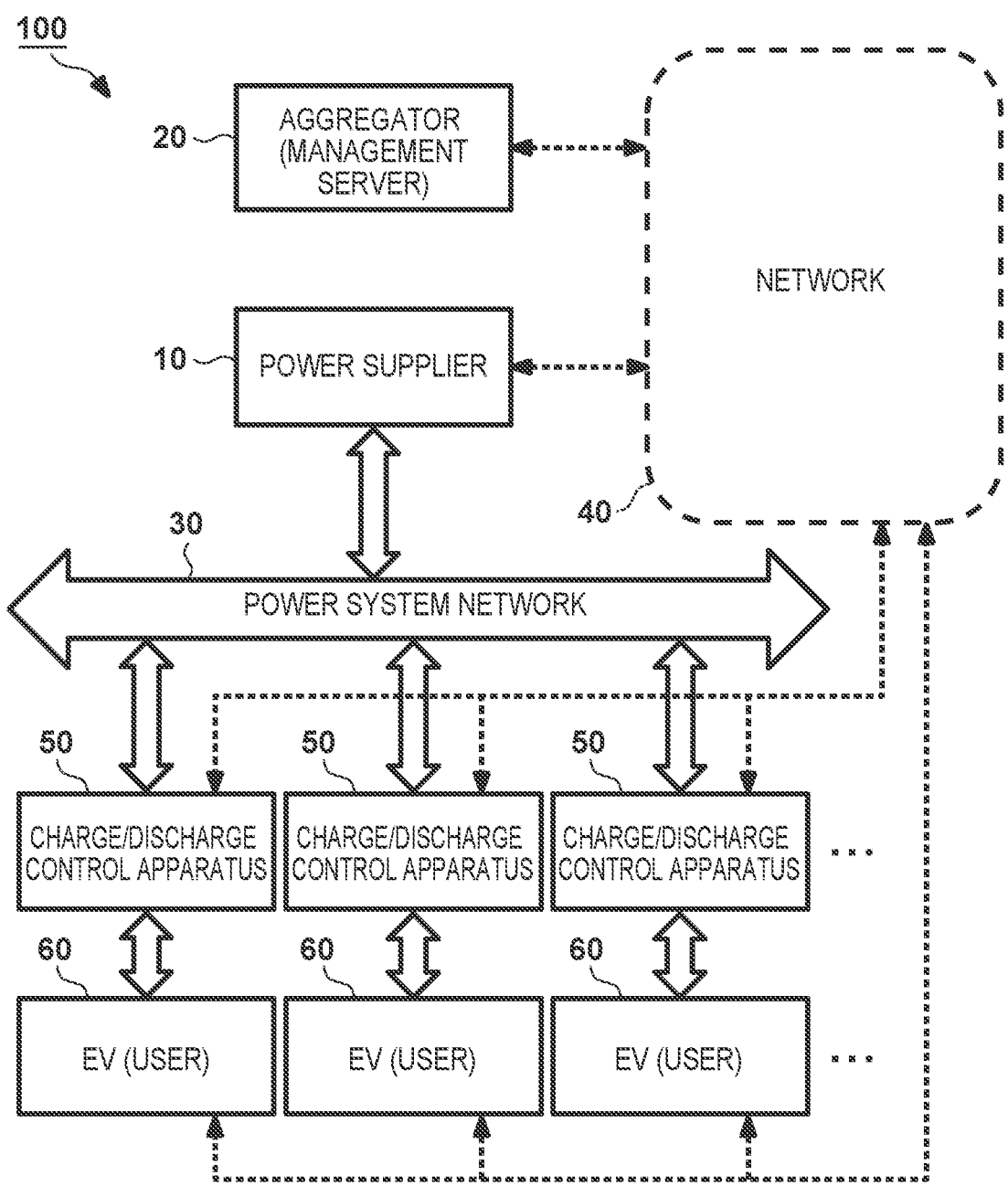
FIG. 1 is a block diagram showing the overall arrangement of a VPP system.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

An embodiment of the present invention will be described. FIG. 1 is a block diagram showing the overall arrangement of a VPP (Virtual Power Plant) system 100 according to this embodiment. In this embodiment, as the VPP system 100, a V2G (Vehicle to Grid) system will be exemplified. The VPP system shown in FIG. 1 includes a power supplier 10, an aggregator (management server) 20, a charge/discharge control apparatus 50, and a power unit 60. In the example shown in FIG. 1, a feeding path is indicated by a block arrow, and a communication path of information or data is indicated by a dashed arrow. Communication of information or data can be either wired or wireless.

The power supplier 10 is, for example, an electricity retailer or an electricity transmission and distribution utility, which supplies power to a plurality of customers via the power system network 30. A customer means a facility itself, such as a home or a factory that receives a VPP service, and in this embodiment, can include the power unit 60, and the charge/discharge control apparatus 50 that controls charge/discharge of the battery of the power unit 60.

The aggregator 20 is located between the power supplier 10 and the customers and provides the VPP service to the customers. For example, the aggregator 20 can function as a management server that integrates/controls the energy management systems of a plurality of customers (power units 60) in a predetermined region via a network 40 (EMS network) and constructs the VPP system. The aggregator 20 acquires the operation plan of the power units 60 according to a request of a power demand in a power market from the power supplier 10 via the network 40, and manages charge/discharge of the battery of each power unit 60 in accordance with the operation plan. The operation plan of the power units 60, which is used to adjust the power demand and supply in the power market, is also called a demand response plan which will also be referred to as a "DR plan" hereinafter.

Here, the demand response (DR) includes a "down DR" and an "up DR". The "down DR" means keeping the demand and supply balance of power by suppressing power consumption of customers or performing discharge from the batteries of customers to the power system network 30, and is also called negawatt trading. On the other hand, the "up DR" means keeping the demand and supply balance of power by increasing power consumption of customers, and is also called posiwatt trading.

The charge/discharge control apparatus 50 can be an apparatus that manages, as the power unit 60, a detachable battery such as a battery mounted in an electric vehicle (EV) or a battery used as a power supply of a home, and controls charge/discharge (charge and/or discharge) of the battery. For example, the charge/discharge control apparatus 50 stores an electric vehicle (EV) including a battery as the power unit 60, and controls charge/discharge of the battery of the electric vehicle with respect to the power system network 30. Other than the electric vehicle (EV), the charge/discharge control apparatus 50 may store a fuel cell vehicle (FCV) or a vehicle with a power generation unit such as a range extender and control discharge of electricity generated in these vehicles. In this embodiment, an electric vehicle (EV) including a battery will be exemplified as the power unit 60, and the electric vehicle will sometimes be referred to as the "electric vehicle 60" hereinafter.

The arrangements of the aggregator 20, the charge/discharge control apparatus 50, and the electric vehicle 60 will be described next with reference to FIGS. 2A to 2C. Note that the arrangement of the charge/discharge control apparatus 50 shown in FIG. 2B can be a computer capable of executing the present invention related to a program.

FIG. 2A is a block diagram showing an example of the arrangement of the aggregator 20 (management server). The aggregator 20 includes, for example, a CPU 21, a storage unit 22, a memory 23, and a communication unit 24, and the units are communicably connected to each other via a system bus 25. The CPU 21 comprehensively controls the aggregator 20 by, for example, reading out a program stored in the storage unit 22 to the memory 23 and executing it. The storage unit 22 stores not only basic programs and data used by the aggregator 20 to operate but also information and data acquired from the power supplier 10 and each customer (for example, the user of each electric vehicle 60). The communication unit 24 is an interface that enables communication with the network 40. In this embodiment, the CPU 21 of the aggregator 20 acquires information 26 (to be also referred to as the "DR plan information 26" hereinafter) concerning a DR plan from the power supplier 10 by the communication unit 24 via the network 40, and stores the acquired DR plan information 26 in the storage unit 22. Also, the CPU 21 transmits the DR plan information 26 to the charge/discharge control apparatus 50, and manages the charge/discharge control apparatus 50 based on the DR plan information.

FIG. 2B is a block diagram showing an example of the arrangement of the charge/discharge control apparatus 50. The charge/discharge control apparatus 50 includes, for example, a CPU 51, a storage unit 52, a memory 53, a charge/discharge connector 54, and a communication unit 55, and the units are communicably connected to each other via a system bus 56. The CPU 51 comprehensively controls the charge/discharge control apparatus 50 by, for example, reading out a program stored in the storage unit 52 to the memory 53 and executing it. The storage unit 52 stores programs and data used to control charge/discharge of a battery 63 of the electric vehicle 60. The charge/discharge connector 54 is connected to a charge/discharge connector 64 of the electric vehicle 60 via a cable to charge/discharge the battery 63 of the electric vehicle 60. The communication unit 55 is an interface that enables communication with the network 40. In this embodiment, the CPU 51 acquires DR plan information from the aggregator 20 (or the power supplier 10) by the communication unit 55 via the network 40, and stores the acquired DR plan information in the storage unit 52. The CPU 51 then controls charge/discharge of the battery of the electric vehicle 60 based on the DR plan information.

Figure 2C:
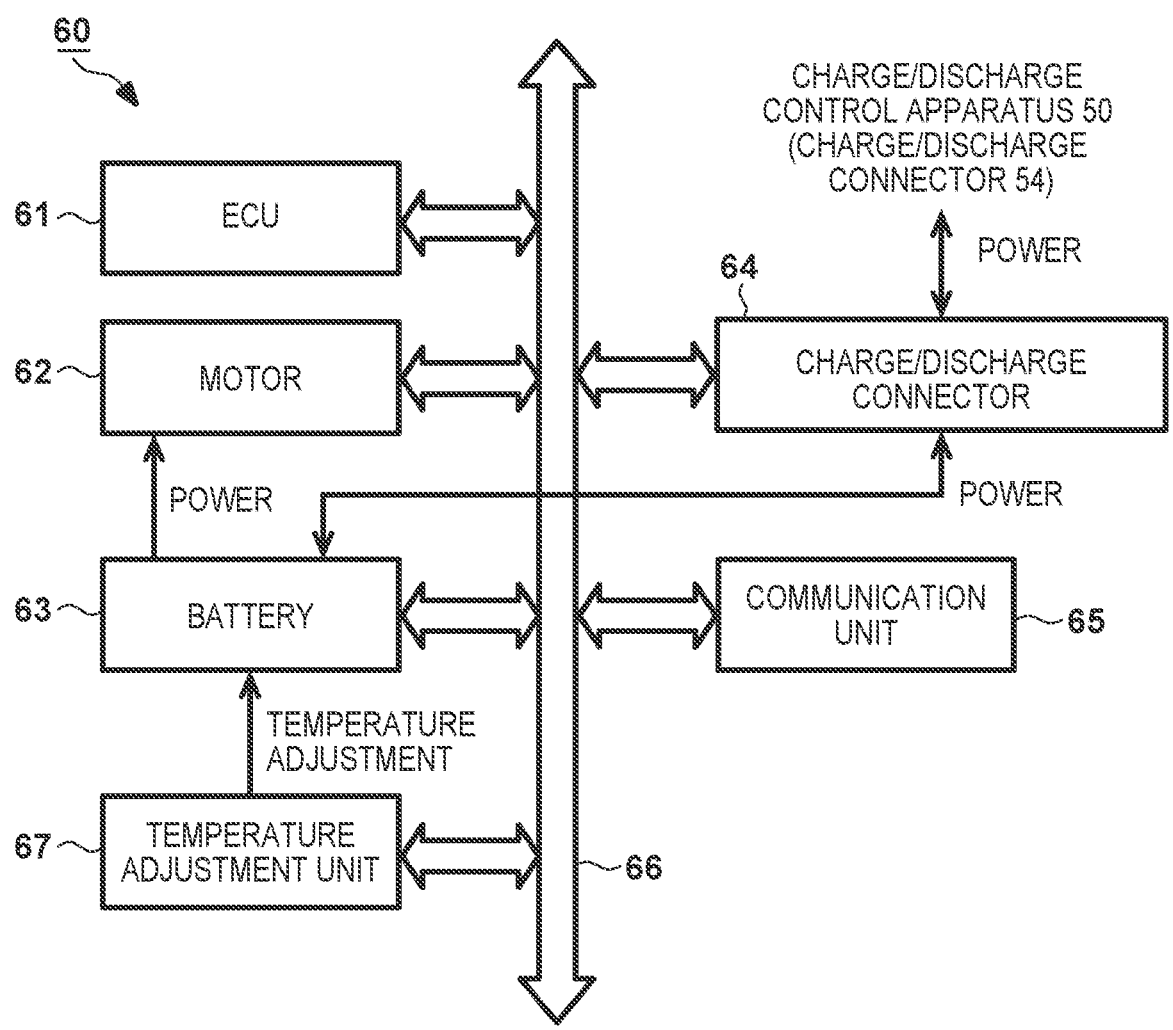

FIG. 2C is a block diagram showing an example of the arrangement of the electric vehicle 60 serving as a power unit. The electric vehicle 60 includes an ECU (Electronic Control Unit) 61, a motor 62, the battery 63, the charge/discharge connector 64, and a communication unit 65, and the units are communicably connected to each other via a system bus 66. The ECU 61 can include a processor represented by a CPU, a storage device such as a semiconductor memory, an interface to an external device, and the like. The motor 62 is driven by the power of the battery 63 and generates the driving force of the electric vehicle 60. The battery 63 is a storage battery that stores power to be supplied to the motor 62, and charge/discharge is controlled by the charge/discharge control apparatus 50. The charge/discharge connector 64 is connected to the charge/discharge connector 54 of the charge/discharge control apparatus 50 via a cable to charge/discharge the battery 63. The communication unit 65 is an interface that enables communication with the network 40.

The electric vehicle 60 according to this embodiment is provided with a temperature adjustment unit (temperature adjuster) 67 that adjusts the temperature of the battery 63, and a measurement unit 68 that measures the temperature of the battery 63. It is known that the charge/discharge characteristics of the battery 63 in the electric vehicle 60, such as the charge/discharge speed (the charge speed and the discharge speed) and the battery capacity generally deteriorate in a low temperature environment (for example, 0° C. or less). Hence, the electric vehicle 60 according to this embodiment is provided with the temperature adjustment unit 67 that adjusts the temperature of the battery 63, as shown in FIG. 2C. The temperature adjustment unit 67 is, for example, a heater attached to the battery 63 to heat (warm) the battery 63. Based on the temperature of the battery 63 measured by the measurement unit 68, the temperature of the battery 63 can be adjusted such that the temperature of the battery 63 becomes a target temperature. When the temperature adjustment unit 67 adjusts the temperature of the battery 63 to the target temperature in this way, charge/discharge of the battery 63 by the charge/discharge control apparatus 50 can efficiently be performed. For example, as shown in FIG. 3, the target temperature can be set to an arbitrary temperature within the temperature range in which the charge/discharge characteristic has a value equal to or larger than a predetermined value (target value) in the relationship between the temperature acquired in advance by experiments and the like and the charge/discharge characteristic of the battery 63.

Here, in the above-described VPP system 100, if temperature adjustment of the battery 63 by the temperature adjustment unit 67 is applied when charging/discharging the battery 63, for example, a loss may occur due to the power cost needed to adjust the temperature of the battery 63 by the temperature adjustment unit 67, or it may be difficult to do the demand response (DR) as planned because of the time needed for the temperature adjustment of the battery 63. Hence, the charge/discharge control apparatus 50 according to this embodiment calculates, based on the DR plan information, an incentive obtained by the charge/discharge (charge or discharge) of the battery 63 by the DR plan and the power cost needed to adjust the temperature of the battery 63 to the target temperature by the temperature adjustment unit 67 at the time of charge/discharge of the battery 63, and determines, based on the calculation result, whether to charge/discharge the battery 63. In addition, the charge/discharge control apparatus 50 controls, based on the DR plan information, the temperature adjustment unit 67 such that the temperature of the battery 63 becomes the target temperature until the timing of starting charge/discharge (charge or discharge) of the battery 63 by the DR plan.

Figure 4:
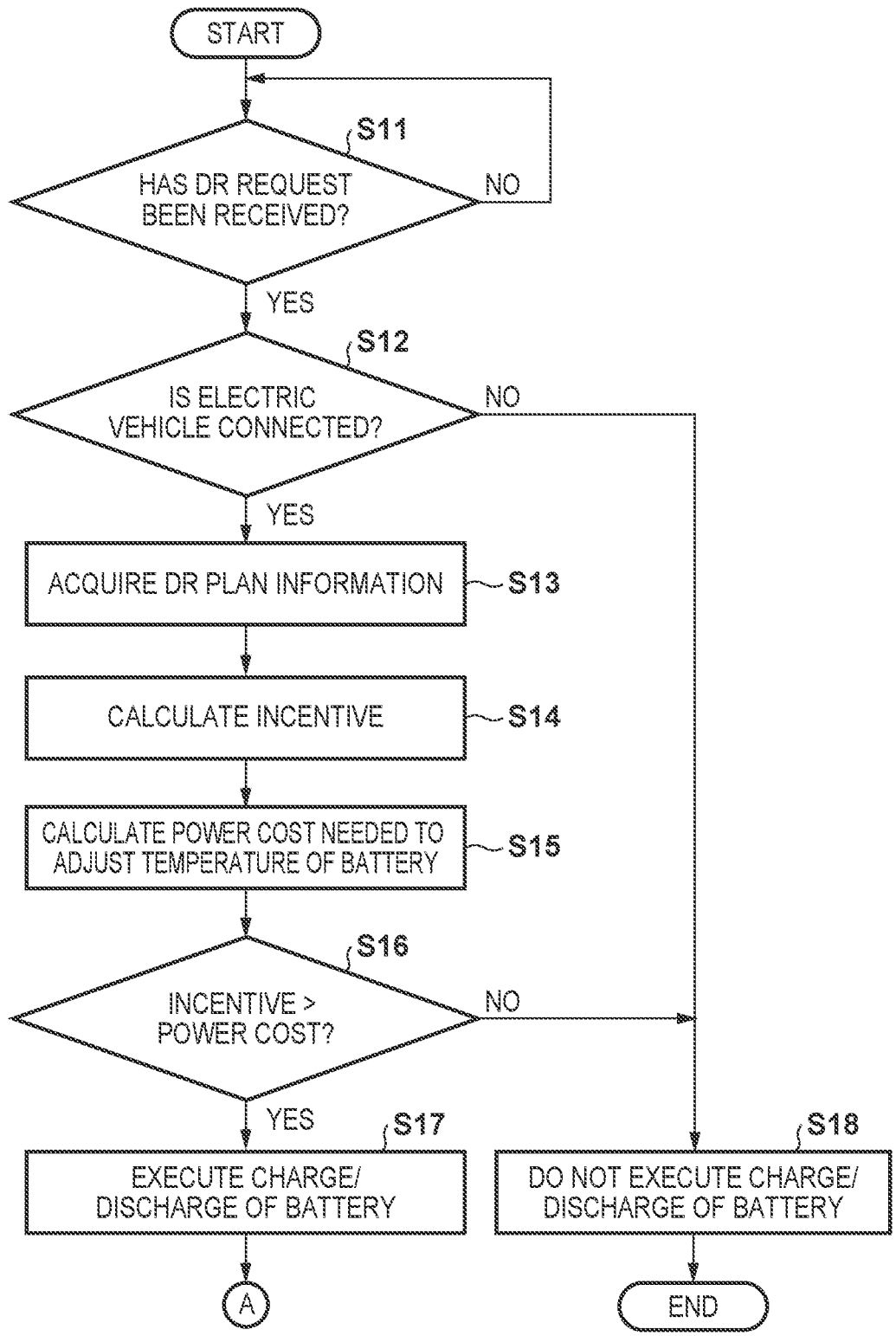
FIG. 4 is a flowchart showing the control procedure of charge/discharge of the battery by a charge/discharge control apparatus.
Figure 5:
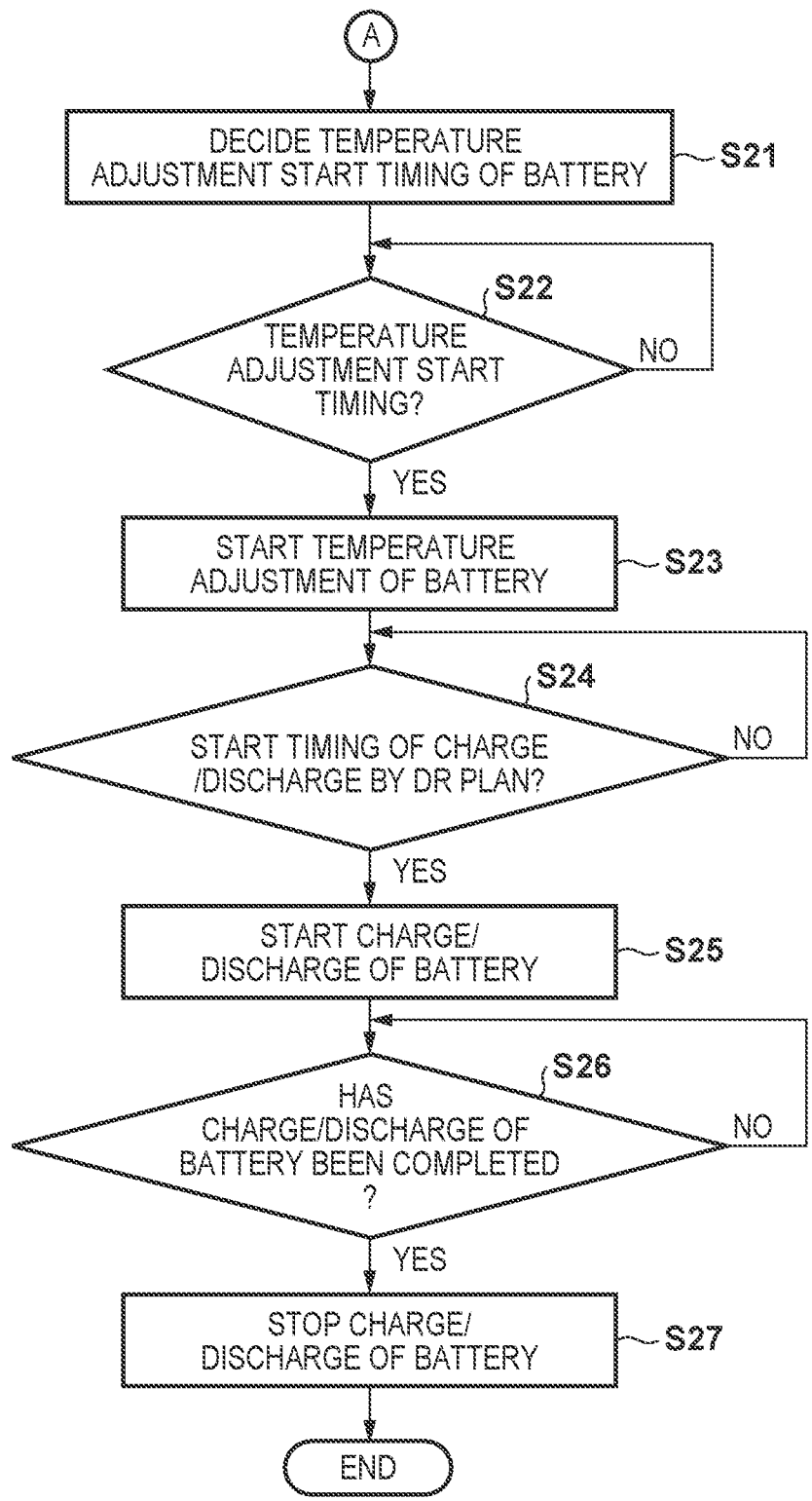
FIG. 5 is a flowchart showing the control procedure of charge/discharge of the battery by the charge/discharge control apparatus.

The control procedure of charge/discharge of the battery 63 of the electric vehicle 60 by the charge/discharge control apparatus 50 will be described next. FIGS. 4 and 5 are flowcharts showing the control procedure of charge/discharge of the battery 63 of the electric vehicle 60 by the charge/discharge control apparatus 50. Each step of the flowcharts shown in FIGS. 4 and 5 can be executed by the CPU 51 of the charge/discharge control apparatus 50. In addition, "charge/discharge" in the following description is intended for one of charge to the battery 63 and discharge from the battery 63.

In the flowchart shown in FIG. 4, in step S11, the CPU 51 determines whether a DR request is received from the aggregator 20. If a DR request is received, the process advances to step S12. If a DR request is not received, step S11 is repeated. In step S12, the CPU 51 determines whether the electric vehicle 60 is connected. That is, the CPU 51 determines whether the charge/discharge connector 54 of the charge/discharge control apparatus 50 and the charge/discharge connector 64 of the electric vehicle 60 are electrically connected via a cable. If the electric vehicle 60 is connected, the process advances to step S13. In the other hand, if the electric vehicle 60 is not connected, the process advances to step S18, and the CPU 51 decides not to execute charge/discharge of the battery 63 of the electric vehicle 60 by a DR plan.

In step S13, the CPU 51 acquires DR plan information from the aggregator 20. The DR plan information can include, for example, information such as the date/time of outputting a DR request, a power [W] and capacity [Wh] of charge/discharge required for the battery 63 of the electric vehicle 60 in the DR plan, a unit price [yen/kWh] of system power, and an incentive unit price [yen/kWh] for the DR request.

In step S14, the CPU 51 calculates an incentive obtained by charge/discharge of the battery 63 by the DR plan. For example, the CPU 51 multiplies the capacity [Wh] required in the DR plan by the unit price [yen/kWh] based on the DR plan information, thereby calculating the incentive [yen].

Note that in this embodiment, the incentive is obtained as a cost. However, it may be obtained as a reward other than a cost.

In step S15, the CPU 51 calculates a power cost needed to adjust the temperature of the battery 63 to the target temperature by the temperature adjustment unit 67. For example, the CPU 51 obtains information concerning the current temperature of the battery 63 measured by the measurement unit 68 of the electric vehicle 60, and obtains an electric energy [kWh] (to be sometimes referred to as a "necessary electric energy" hereinafter) needed to adjust the temperature of the battery 63 to the target temperature by the temperature adjustment unit 67. More specifically, the CPU 51 can obtain the relationship between the temperature change amount of the battery 63 and the electric energy of the temperature adjustment unit 67 in advance and obtain the necessary electric energy [kWh] using the relationship. Then, the CPU 51 multiplies the obtained necessary electric energy [kWh] by the unit price [yen/kWh] of the system power in the DR plan information, thereby calculating the power cost [yen].

In step S16, the CPU 51 compares the incentive calculated in step S14 with the power cost calculated in step S15. If the incentive is larger than the power cost, the process advances to step S17, and the CPU 51 decides to execute charge/discharge of the battery 63 by the DR plan. Then, the process advances to step S21 of the flowchart shown in FIG. 5. On the other hand, if the incentive is equal to or smaller than the power cost, the process advances to step S18, and the CPU 51 decides not to execute charge/discharge of the battery 63 of the electric vehicle 60 by the DR plan.

The process advances to the flowchart shown in FIG. 5. In step S21, the CPU 51 decides the temperature adjustment start timing of the battery 63 by the temperature adjustment unit 67. For example, the CPU 51 acquires (grasps) the start timing (start time) of charge/discharge of the battery 63 by the DR plan based on the DR plan information. The CPU 51 decides the temperature adjustment start timing of the battery 63 based on the relationship between the temperature change amount of the battery 63 and the electric energy of the temperature adjustment unit 67, which is acquired in advance, such that the temperature of the battery 63 reaches the target temperature until the start timing of charge/discharge or preferably at the start timing of charge/discharge.

In step S22, the CPU 51 determines whether it is the temperature adjustment start timing decided in step S21. If it is not the temperature adjustment start timing, step S22 is repeated. On the other hand, if it is the temperature adjustment start timing, the process advances to step S23, and the CPU 51 starts temperature adjustment of the battery 63 by the temperature adjustment unit 67. It is therefore possible to make the temperature of the battery 63 reach the target temperature until the start timing of charge/discharge of the battery 63 by the DR plan.

In step S24, the CPU 51 determines whether it is the start timing of charge/discharge of the battery 63 by the DR plan. If it is not the start timing of charge/discharge, step S24 is repeated. On the other hand, if it is the start timing of charge/discharge, the process advances to step S25, and the CPU 51 starts charge/discharge of the battery 63 by the DR plan. Also, in step S26, the CPU 51 determines whether the charge/discharge of the battery 63 is completed. If the charge/discharge of the battery 63 is not completed, step S26 is repeated to continuously perform the charge/discharge of the battery 63. On the other hand, if the charge/discharge of the battery 63 is completed, the process advances to step S27 to stop the charge/discharge of the battery 63.

As described above, the charge/discharge control apparatus 50 (CPU 51) according to this embodiment calculates the incentive obtained by charge/discharge of the battery 63 by the DR plan and the power cost needed to adjust the temperature of the battery to the target temperature by the temperature adjustment unit 67, and determines, based on the calculation result, whether to perform charge/discharge of the battery 63. This can reduce a loss for a customer caused by adjusting the temperature of the battery 63 and appropriately ensure interests (incentive) obtained by the charge/discharge of the battery 63 by the DR plan.

In addition, the charge/discharge control apparatus 50 (CPU 51) according to this embodiment controls temperature adjustment of the battery 63 by the temperature adjustment unit 67 such that the temperature of the battery 63 reaches the target temperature until the start timing of charge/discharge of the battery 63 by the DR plan. Since this can set the charge/discharge characteristic of the battery 63 to a predetermined value or more until the start timing of charge/discharge, charge/discharge of the battery 63 according to the DR plan can efficiently be executed.

Here, in this embodiment, each step of the flowcharts shown in FIGS. 4 and 5 is executed by the CPU 51 of the charge/discharge control apparatus 50. However, the present invention is not limited to this, and the steps may be executed by the processor (ECU 61) of the electric vehicle 60 (power unit), or may be executed by the CPU 21 of the aggregator 20 (management server). That is, the function of the charge/discharge control apparatus 50 (CPU 51) according to this embodiment may be held by at least one of the processor (ECU 61) of the electric vehicle (power unit) and the CPU 21 of the aggregator 20 (management server). When the CPU 21 of the aggregator 20 (management server) is caused to execute each step of the flowcharts shown in FIGS. 4 and 5, centralized control of a plurality of power units (an electric vehicle and a stationary battery) by the management server can be performed. If a plurality of power units are controlled, and both the electric vehicle and the stationary battery exist as the power units, centralized control by the management server is effective.

Also, in this embodiment, an example in which charge/discharge of the battery of the electric vehicle is controlled as a power unit has been described. The present invention can also be applied to a case in which charge/discharge of a stationary battery is controlled as a power unit. That is, in the example shown in FIG. 1, at least one of the electric vehicles (EVs) 60 may be replaced with a stationary battery. In this case, each step of the flowcharts shown in FIGS. 4 and 5 may be executed by the CPU 51 of the charge/discharge control apparatus 50, a processor (ECU) incorporated in the stationary battery, or the CPU 21 of the aggregator 20 (management server).

SUMMARY OF EMBODIMENT

1. A control apparatus according to the above-described embodiment is a control apparatus (for example, 50) configured to control a power unit (for example, 60), wherein the power unit comprises a battery (for example, 60), and a temperature adjuster (for example, 67) configured to adjust a temperature of the battery to a target temperature at the time of charge or discharge of the battery, and the control apparatus calculates, based on information concerning a demand response plan used to adjust a power demand and supply, an incentive obtained by charge or discharge of the battery by the demand response plan and a power cost needed to adjust the temperature of the battery to the target temperature by the temperature adjuster at the time of charge or discharge of the battery, and controls, in a case where the incentive is larger than the power cost, controls the power unit to execute charge or discharge of the battery by the demand response plan.

According to this embodiment, it is possible to reduce a loss for a customer caused by adjusting the temperature of the battery and appropriately ensure interests (incentive) obtained by the charge/discharge of the battery by the demand response (DR) plan.

2. In the above-described embodiment, the control apparatus controls the temperature adjuster based on the information concerning the demand response plan such that the temperature of the battery reaches the target temperature until a start timing of the charge or discharge of the battery by the demand response plan.

According to this embodiment, since the charge/discharge characteristic of the battery can be set to a predetermined value or more until the start timing of charge/discharge, charge/discharge of the battery according to the demand response (DR) plan can efficiently be executed.

3. In the above-described embodiment, the control apparatus controls the temperature adjuster such that the temperature of the battery reaches the target temperature at the start timing of the charge or discharge of the battery.

According to this embodiment, since the temperature of the battery is made to reach the target temperature at the start timing of the charge or discharge of the battery, it is possible to reduce the power cost needed to maintain the temperature of the battery at the target temperature after adjusted to the target temperature.

4. In the above-described embodiment, in a case where the incentive is not more than the power cost, the control apparatus does not execute the charge or discharge of the battery by the demand response plan.

According to this embodiment, if the interests (incentive) cannot be obtained when the temperature of the battery is adjusted, the demand response is not executed, thereby reducing a loss for a customer.

5. A control apparatus according to the above-described embodiment is a control apparatus (for example, 50) configured to control a power unit (for example, 60), wherein the power unit comprises a battery (for example, 63), and a temperature adjuster (for example, 67) configured to adjust a temperature of the battery to a target temperature at the time of charge or discharge of the battery, and the control apparatus controls the temperature adjuster based on information concerning a demand response plan used to adjust a power demand and supply, such that the temperature of the battery reaches the target temperature until a start timing of the charge or discharge of the battery by the demand response plan.

According to this embodiment, since the charge/discharge characteristic of the battery can be set to a predetermined value or more until the start timing of charge/discharge, charge/discharge of the battery according to the demand response (DR) plan can efficiently be executed.

6. According to the above-described embodiment, the power unit is at least one of an electric vehicle and a stationary battery.

According to this embodiment, it is possible to provide a VPP system (V2G system) using at least one of an electric vehicle and a stationary battery.

7. A management server according to the above-described embodiment is a management server (for example, 20) configured to manage a plurality of power units (for example, 60), and the management server includes a control apparatus according to the above-described embodiment.

According to this embodiment, centralized control of a plurality of power units (an electric vehicle and a stationary battery) by the management server can be performed. If a plurality of power units are controlled, and both the electric vehicle and the stationary battery exist as the power units, centralized control by the management server is effective.

The invention is not limited to the foregoing embodiments, and various variations/changes are possible within the spirit of the invention.

What is claimed is:

1. A control apparatus configured to control a power unit, wherein
the power unit includes a battery, and a temperature adjuster configured to adjust a temperature of the battery to a target temperature when executing charge or discharge of the battery, and
the control apparatus is configured to
calculate, based on information concerning a demand response plan used to adjust a power demand and supply, an incentive to be obtained by executing charge or discharge of the battery in accordance with the demand response plan and a cost of electric energy to be needed to adjust the temperature of the battery to the target temperature by the temperature adjuster when executing charge or discharge of the battery, and
control, in a case where the calculated incentive is larger than the calculated cost, the power unit so as to adjust the temperature of the battery to the target temperature by the temperature adjuster and execute charge or discharge of the battery in accordance with the demand response plan.

2. The apparatus according to claim 1, wherein in the case where the calculated incentive is larger than the calculated cost, the control apparatus controls the temperature adjuster based on the information concerning the demand response plan, such that the temperature of the battery reaches the target temperature until a start timing of the charge or discharge of the battery in accordance with the demand response plan.

3. The apparatus according to claim 2, wherein the control apparatus controls the temperature adjuster such that the temperature of the battery reaches the target temperature at the start timing of the charge or discharge of the battery.

4. The apparatus according to claim 1, wherein in a case where the calculated incentive is not larger than the calculated cost, the control apparatus does not execute the charge or discharge of the battery in accordance with the demand response plan.

5. The apparatus according to claim 1, wherein the power unit is at least one of an electric vehicle and a stationary battery.

6. A management server configured to manage a plurality of power units, comprising a control apparatus described in claim 1.

7. The control apparatus according to claim 1, wherein
the power unit includes a measurement unit configured to measure a current temperature of the battery, and
the control apparatus is configured to obtain the electric energy to be needed to adjust the temperature of the battery by the temperature adjuster from the current temperature measured by the measurement unit to the target temperature, and calculate the cost based on the obtained electric energy.

8. A control method of controlling a power unit, wherein
the power unit includes a battery, and a temperature adjuster configured to adjust a temperature of the battery to a target temperature when executing charge or discharge of the battery, and
the control method comprises:
calculating, based on information concerning a demand response plan used to adjust a power demand and supply, an incentive to be obtained by executing charge or discharge of the battery in accordance with the demand response plan and a cost of electric energy to be needed to adjust the temperature of the battery to the target temperature by the temperature adjuster when executing charge or discharge of the battery, and
controlling, in a case where the calculated incentive is larger than the calculated cost, the power unit so as to adjust the temperature of the battery to the target temperature by the temperature adjuster and execute charge or discharge of the battery in accordance with the demand response plan.

9. A non-transitory computer-readable storage medium storing a program for causing a computer to execute a control method according to claim 8.

* * * * *